United States Patent [19]
Ford

[11] 3,956,935
[45] May 18, 1976

[54] ENGINE COOLING SYSTEM FAULT ANALYZER

[75] Inventor: Curtis A. Ford, Hempstead, N.Y.

[73] Assignee: The Raymond Lee Organization, Inc., New York, N.Y.; a part interest

[22] Filed: Dec. 24, 1974

[21] Appl. No.: 536,260

[52] U.S. Cl. .................................. 73/347; 73/118
[51] Int. Cl.² .................................. G01K 1/02
[58] Field of Search ............... 73/347, 119 R, 118, 73/168

[56] References Cited
UNITED STATES PATENTS

| | | | |
|---|---|---|---|
| 2,018,403 | 10/1935 | Hassar | 73/118 |
| 3,292,427 | 12/1966 | Mattson | 73/118 |
| 3,296,854 | 1/1967 | Morgan | 73/118 |
| 3,793,997 | 2/1974 | Banner | 73/118 X |

Primary Examiner—Jerry W. Myracle
Attorney, Agent, or Firm—Daniel Jay Tick

[57] ABSTRACT

An inlet couples a duct system to a point in the cooling system of a liquid-cooled engine. A liquid differential adjusting device in the duct system adjusts for the type of liquid in the cooling system. A thermometer in the duct system detects and indicates the temperature of the liquid in the system. A pressure gage in the duct system detects and indicates the pressure of the liquid in the system. An outlet couples the duct system to another point in the cooling system of the engine.

1 Claim, 2 Drawing Figures

ENGINE COOLING SYSTEM FAULT ANALYZER

DESCRIPTION OF THE INVENTION

The present invention relates to an engine cooling system fault analyzer. More particularly, the invention relates to an engine cooling system fault analyzer for a liquid-cooled engine.

Objects of the invention are to provide an engine cooling system fault analyzer of simple structure, which is inexpensive in manufacture, readily portable and transportable, utilizable with new and existing vehicles having liquid-cooled engines, and functions efficiently, effectively and reliably indicates and identifies malfunctions in the cooling system of the engine.

Figure 1:
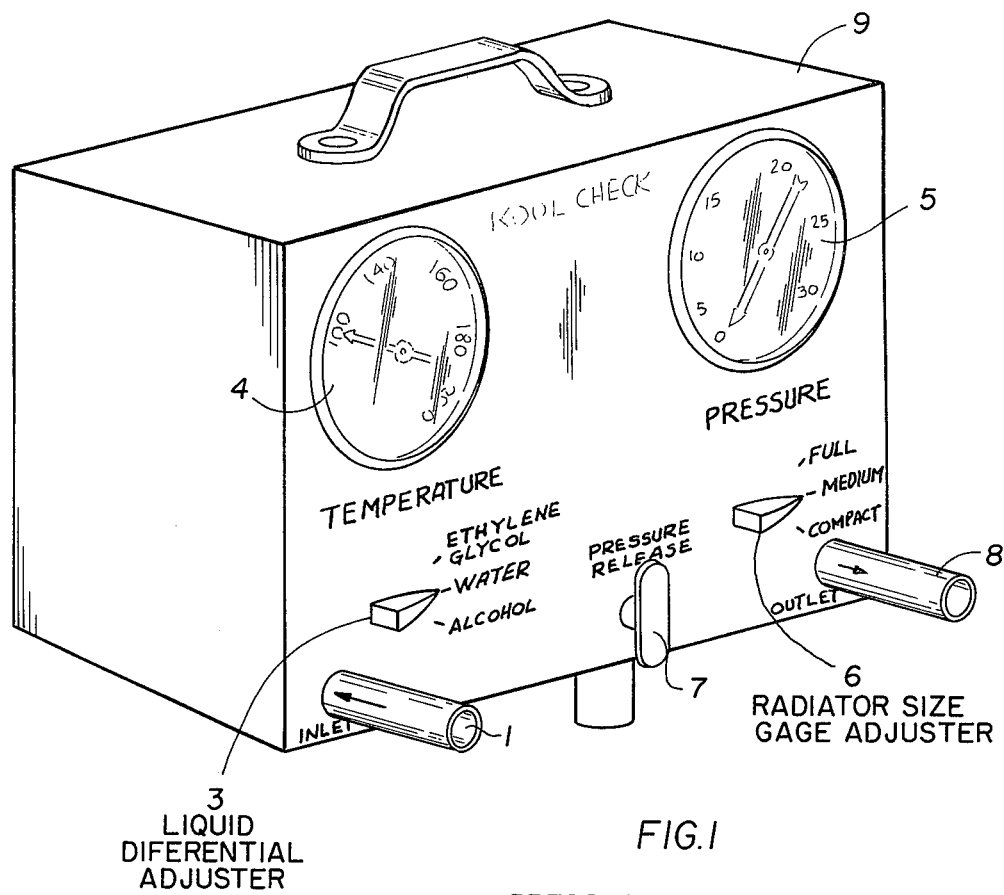
Figure 2:
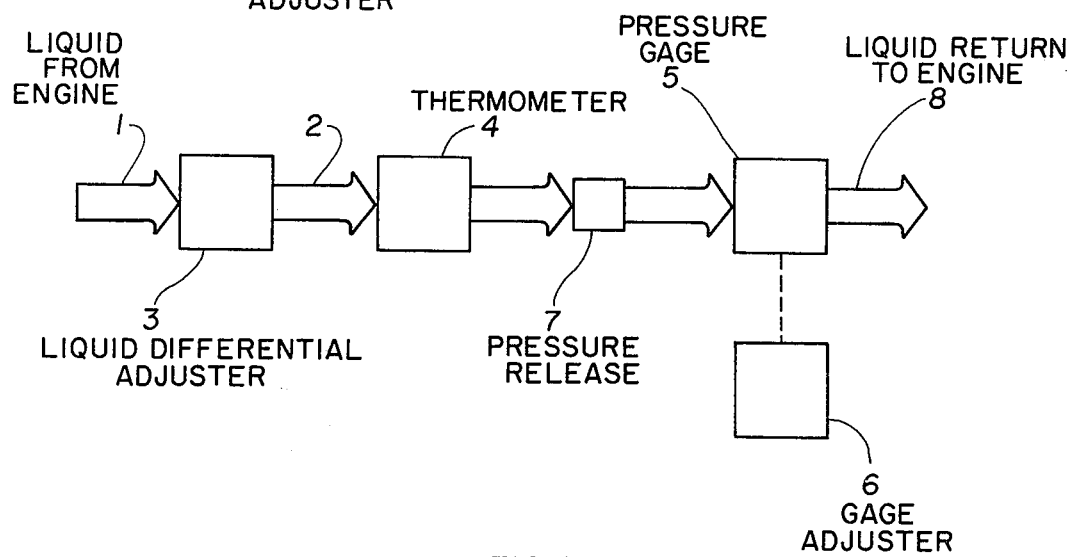

In order that the invention may be readily carried into effect, it will now be described with reference to the accompanying drawing, wherein:

FIG. 1 is a schematic diagram of an embodiment of the engine cooling system fault analyzer of the invention; and FIG. 2 is a block diagram of the embodiment of FIG. 1.

The engine cooling system fault analyzer of the invention is for a liquid-cooled engine.

The fault analyzer of the invention comprises an inlet 1 for coupling a duct system 2 to a point in the cooling system of a liquid-cooled engine (not shown in the FIGS.) A liquid differential adjusting device 3 of any suitable type known in the art is provided in the duct system 2 for adjusting for the type of liquid in the cooling system such as, for example, permanent or temporary antifreeze, or water.

A thermometer 4 is provided in the duct system 2 for detecting and indicating the temperature of the liquid in the system.

A pressure gage 5 is provided in the duct system 2 for detecting and indicating the pressure of the liquid in the system. The cooling system of the engine includes a radiator and the fault analyzer includes a gage adjusting device 6 coupled to the pressure gage 5 for adjusting said pressure gage for the size of the radiator. A pressure release 7 in the duct system 2 releases the pressure in said duct system.

An outlet 8 couples the duct system 2 to another point in the cooling system of the engine.

The inlet 1, the liquid differential adjustor 3, the thermometer 4, the pressure gage 5 and the outlet 6 are accommodated in a portable housing 9.

Each of the thermometer 4 and the pressure gage 5 are commercially available. The thermometer 4 is electrical. The leads of the analyzer of the invention are connected to the 12 volt battery of an automotive vehicle. If the vehicle has a 24 volt battery or a magneto, a 12 volt battery is utilized with the analyzer.

While the invention has been described by means of a specific example and in a specific embodiment, I do not wish to be limited thereto, for obvious modifications will occur to those skilled in the art without departing from the spirit and scope of the invention.

I claim:

1. An engine cooling system fault analyzer for a liquid-cooled engine having a radiator, said fault analyzer comprising duct means;

inlet means for coupling the duct means to a point in the cooling system of a liquid-cooled engine;

liquid differential adjusting means in the duct means for adjusting for the type of antifreeze, water, and the like, in the cooling system;

thermometer means in the duct means for detecting and indicating the temperature of the liquid in the system;

pressure means in the duct means for detecting and indicating the pressure of the liquid in the system;

outlet means for coupling the duct means to another point in the cooling system of the engine;

gage adjusting means coupled to the pressure means for adjusting the pressure means for the size of the radiator;

pressure release means in the duct means for releasing the pressure therein; and a portable housing accommodating the duct means, the inlet means, the liquid differential adjusting means, the thermometer means, the pressure means, the gage adjusting means, the pressure release means and the outlet means.

* * * * *